US012720242B2

(12) United States Patent
Zhang et al.

(10) Patent No.: US 12,720,242 B2
(45) Date of Patent: Aug. 25, 2026

(54) HOUSING OF SOUND GENERATING DEVICE, SOUND GENERATING DEVICE AND ELECTRONIC APPARATUS THEREOF

(71) Applicant: GOERTEK INC., Weifang (CN)

(72) Inventors: Haitao Zhang, Weifang (CN); Meiling Li, Weifang (CN); Chun Li, Weifang (CN); Chengfei Zhang, Weifang (CN); Chunfa Liu, Weifang (CN)

(73) Assignee: GOERTEK INC., Weifang (CN)

( * ) Notice: Subject to any disclaimer, the term of this patent is extended or adjusted under 35 U.S.C. 154(b) by 154 days.

(21) Appl. No.: 18/843,720

(22) PCT Filed: Feb. 24, 2023

(86) PCT No.: PCT/CN2023/078105
§ 371 (c)(1),
(2) Date: Sep. 4, 2024

(87) PCT Pub. No.: WO2024/001245
PCT Pub. Date: Jan. 4, 2024

(65) Prior Publication Data
US 2025/0175725 A1 May 29, 2025

(30) Foreign Application Priority Data
Jun. 30, 2022 (CN) ......................... 202210770723.4

(51) Int. Cl.
*H04R 1/02* (2006.01)
*H04R 1/28* (2006.01)

(52) U.S. Cl.
CPC ............. *H04R 1/025* (2013.01); *H04R 1/021* (2013.01); *H04R 1/2896* (2013.01); *H04R 2201/029* (2013.01)

(58) Field of Classification Search
CPC ...... H04R 1/025; H04R 1/021; H04R 1/2896; H04R 2201/029; H04R 2400/11;
(Continued)

(56) References Cited

U.S. PATENT DOCUMENTS 5,748,758 A * 5/1998 Menasco, Jr. .......... H04R 23/00 381/174
6,106,474 A * 8/2000 Koger .................. B06B 1/0674 600/467
(Continued)

FOREIGN PATENT DOCUMENTS

CN 205793291 U 12/2016
CN 106454654 A 2/2017
(Continued)

OTHER PUBLICATIONS

International Search Report from International Application No. PCT/CN2023/078105 mailed May 23, 2023.

*Primary Examiner* — Oyesola C Ojo
(74) *Attorney, Agent, or Firm* — Shih IP Law Group, PLLC

(57) ABSTRACT

A housing of a sound generating device, the sound generating device and an electronic apparatus are provided. At least a part of the housing of the sound generating device is formed as a supporting part, at least a part of the supporting part is made of organic aerogel material, the organic aerogel material has a mesh structure on which reinforcement material is distributed, the reinforcement material accounts for 0 wt % to 40 wt % of the supporting part, and a specific modulus of the supporting part is 1.5 GPa·cm$^3$/g to 40 GPa·cm$^3$/g. At least part of the housing of the sound generating device is formed as the supporting part, the supporting part including organic aerogel material with a mesh structure and reinforcement material disposed on the mesh
(Continued)

structure. Thus, the housing of the sound generating device has advantages of high strength, light weight and strong applicability.

13 Claims, 3 Drawing Sheets

(58) Field of Classification Search
CPC .... H04R 2499/11; H04R 1/2888; H04R 9/02; H04R 9/06; H04R 1/288
See application file for complete search history.

(56) References Cited

U.S. PATENT DOCUMENTS

| | | | | |
|---|---|---|---|---|
| 6,677,034 | B1 * | 1/2004 | Hooley | F16C 29/025 428/323 |
| 2002/0015837 | A1 * | 2/2002 | Funakoshi | B32B 5/18 428/318.6 |
| 2005/0089187 | A1 * | 4/2005 | Tummire | H04R 7/125 381/396 |
| 2017/0353785 | A1 * | 12/2017 | Choi | H04R 1/025 |
| 2019/0322535 | A1 * | 10/2019 | Sonn | B01J 27/24 |
| 2019/0356974 | A1 * | 11/2019 | Loeppert | H04R 19/04 |
| 2023/0023601 | A1 * | 1/2023 | Oh | H04R 1/2876 |
| 2024/0323612 | A1 * | 9/2024 | Palmer | H04R 9/025 |

FOREIGN PATENT DOCUMENTS

| | | | | |
|---|---|---|---|---|
| CN | 107099117 | A | 8/2017 | |
| CN | 108238602 | A | 7/2018 | |
| CN | 110351637 | A * | 10/2019 | H04R 7/02 |
| CN | 112415751 | A | 2/2021 | |
| CN | 114031366 | A | 2/2022 | |
| CN | 115278486 | A | 11/2022 | |
| JP | H05191891 | A | 7/1993 | |

* cited by examiner

HOUSING OF SOUND GENERATING DEVICE, SOUND GENERATING DEVICE AND ELECTRONIC APPARATUS THEREOF

TECHNICAL FIELD

The present disclosure relates to a technical field of electroacoustics, and more specifically, to a housing of a sound generating device, the sound generating device and an electronic apparatus using the sound generating device.

BACKGROUND

The loudspeaker is used more and more widely in daily life, and a requirement of a user for a structure of the loudspeaker is gradually changed to a lightweight requirement and a thin requirement. Therefore, the requirements for weight, acoustic performance and reliability of a product have gradually become important indicators of quality of the loudspeaker.

For a housing of the loudspeaker, a common molding method thereof is to form a plastic housing required for the product by injection in a mold. Under a condition that the structure of the loudspeaker is required to be lightweight, a thickness of the housing is reduced to reduce the weight of the product of the loudspeaker in the conventional art, but it will make a stiffness of the housing small, and it therefore is easy to cause resonance and affect the acoustic performance. In the related art, it is also proposed a solution that a metal reinforcement plate is injected to the plastic housing to improve the stiffness of the housing, but a sealing effect between the plastic housing and the metal reinforcement plate is not good, and a gap between the plastic housing and the metal reinforcement plate affects the waterproof effect of the housing.

SUMMARY

An object of the present disclosure is to provide a housing of a sound generating device, which can solve a technical problem that the loudspeaker in the related art has large mass and small stiffness.

Another object of the present disclosure is to provide a sound generating device including the above housing.

Yet another object of the present disclosure is to provide an electronic apparatus including the above sound generating device.

In order to achieve the above purposes, the present disclosure provides the following technical solutions.

According to an embodiment of a first aspect of the present disclosure, a housing of a sound generating device is provided, wherein at least a part of the housing is formed as a supporting part, at least a part of the supporting part is made of organic aerogel material, the organic aerogel material has a mesh structure on which reinforcement material is distributed, the reinforcement material accounts for 0 wt % to 40 wt % of the supporting part, and a specific modulus of the supporting part is 1.5 GPa·cm$^3$/g to 40 GPa·cm$^3$/g.

According to several embodiments of the present disclosure, the whole of the housing is composed of the supporting part.

According to several embodiments of the present disclosure, the reinforcement material accounts for 10 wt % to 20 wt % of the supporting part.

According to several embodiments of the present disclosure, a density of the supporting part is 0.1 g/cm$^3$ to 1.5 g/cm$^3$.

According to several embodiments of the present disclosure, the reinforcement material is reinforcement fibers and/or reinforcement particles.

According to several embodiments of the present disclosure, the reinforcing fibers form the mesh structure by the organic aerogel material, and the reinforcing fibers accounts for 0 wt % to 40 wt % of the supporting part.

According to several embodiments of the present disclosure, the organic aerogel material has an open channel, the reinforcement particles are combined with a wall of the open channel to support the organic aerogel material, and the reinforcement particles account for 0 wt % to 30 wt % of the supporting part.

According to several embodiments of the present disclosure, a bending modulus of the supporting part is 0.3 GPa to 20 GPa; and/or a modulus-to-density ratio of the supporting part is between 1.5 GPa·cm$^3$/g and 40 GPa·cm$^3$/g.

According to several embodiments of the present disclosure, the organic aerogel material is made of at least one selected from a group consisting of polyimide, polyamide, polyester, aldehyde, polyolefin, polysaccharide and silicone.

According to several embodiments of the present disclosure, a thickness of the housing is 0.2 mm to 5 mm.

According to several embodiments of the present disclosure, the housing also includes a body part adhered to the supporting part or integrally injection molded with the supporting part, wherein the body part is made of at least one selected from a group consisting of PC and modified material thereof, PA and modified material thereof, PPS and modified material thereof, PP and modified material thereof, ABS and modified material thereof, LCP and modified material thereof, PEI and modified material thereof, phenolic resin and modified material thereof, epoxy resin and modified material thereof, unsaturated polyester and modified material thereof, stainless steel, aluminum alloy, magnesium alloy and metal-based composite material.

According to an embodiment of a second aspect of the present disclosure, the sound generating device includes any one of the housing of the above sound generating device.

According to an embodiment of a second aspect of the present disclosure, an electronic apparatus includes any one of the above sound generating device.

According to an embodiment of the present disclosure, at least a part of the housing of the sound generating device includes the supporting part, and at least one part of the supporting part uses the organic aerogel material, and the organic aerogel material may be used as a frame and may form an organic aerogel mesh structural material. The reinforcement material is disposed in the organic aerogel material. When the reinforcement material is the reinforcement fibers, the reinforcement fibers may be used as the frame to support the organic aerogel mesh structural material. When the reinforcement material is the reinforcement particles, the reinforcement particles may be combined with the wall of the organic aerogel mesh structure material, which can also support the organic aerogel material. The housing of the sound generating device of the present disclosure has advantages of light weight, high strength and strong applicability.

Other features of the disclose and advantages thereof will become clear by the following detailed description of exemplary embodiments of the present disclosure with reference to the drawings.

BRIEF DESCRIPTION OF DRAWINGS

The drawings, which are combined in the description and constitute a part of the description, shows embodiments of the present discloses, and along with the description thereof are used to explain the principle of the present disclosure.

Figure 1:
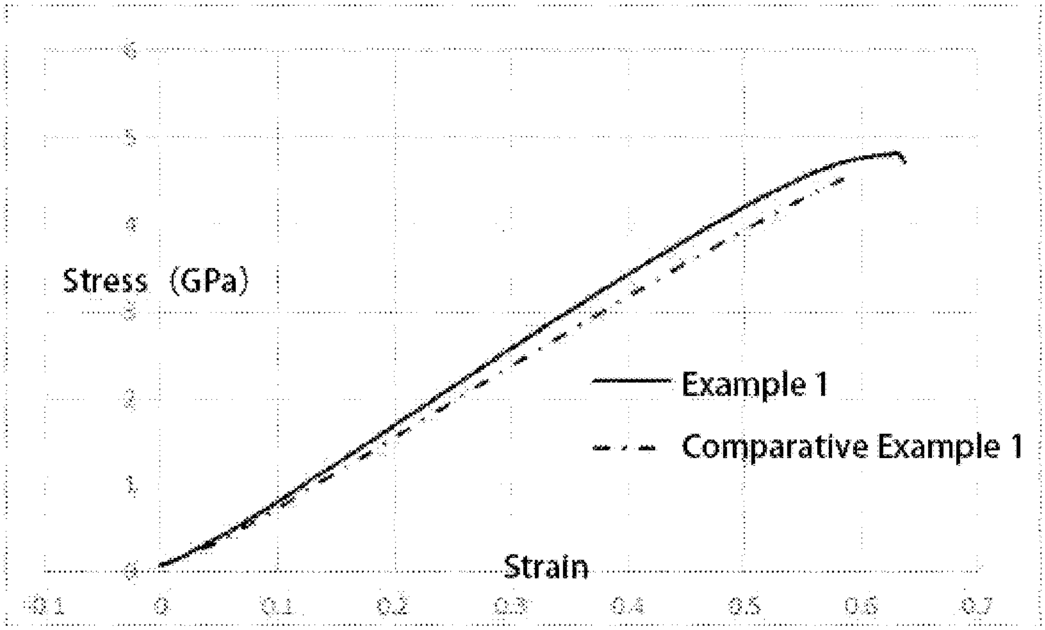
FIG. 1 is stress-strain diagram of housings of Example 1 and Comparative Example 1 of a sound generating device of the present disclosure.

REFERENCE NUMERALS sound generating device 100;
housing 10; upper housing 11; lower housing 12;
sound generating unit 20.

DETAILED DESCRIPTIONS

Various exemplary embodiments of the present disclosure will now be described in detail with reference to the drawings. It should be noted that, unless otherwise specified, the relative arrangements, numerical expressions and numerical values of parts and steps described in these embodiments do not limit the scope of the disclosure.

The following description to at least one exemplary embodiment is only illustrative, but not as any limitation to the present disclosure and the application thereof.

Techniques, methods and apparatuses known to ordinary skilled in the related art may not be discussed in detail, but where appropriate, the techniques, the methods and the apparatuses shall be considered as parts of the specification.

In all the examples shown and discussed herein, any specific value should be interpreted as merely exemplary and not as a limitation. Therefore, other examples of exemplary embodiments may have different values.

It should be noted that similar reference numbers and letters represent similar items in the following drawings, so that once a term is defined in one of the drawings, it does not need to be further discussed in subsequent drawings.

The following will describe a housing 10 of a sound generating device 100 according to an embodiment of the present disclosure in detail in conjunction with the drawings.

Figure 3:
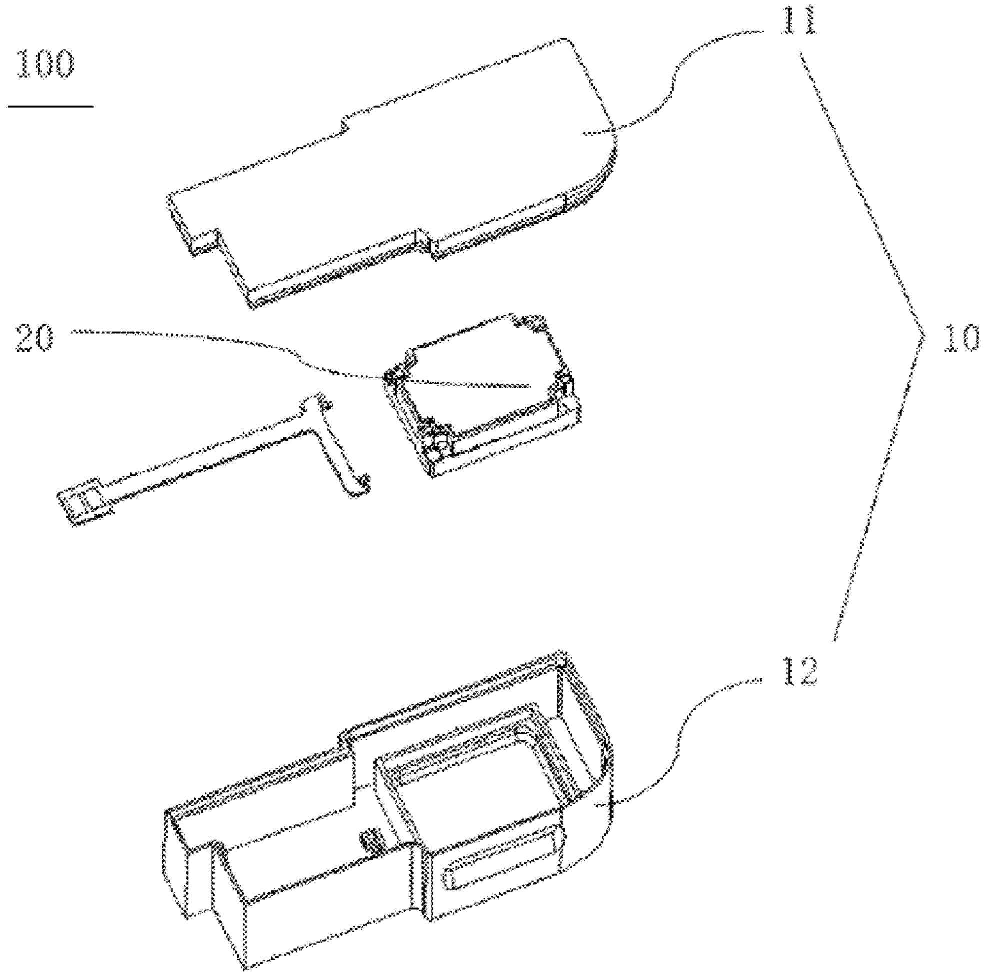
FIG. 3 is a structural diagram of a sound generating device according to an embodiment of the present disclosure.
Figure 4:
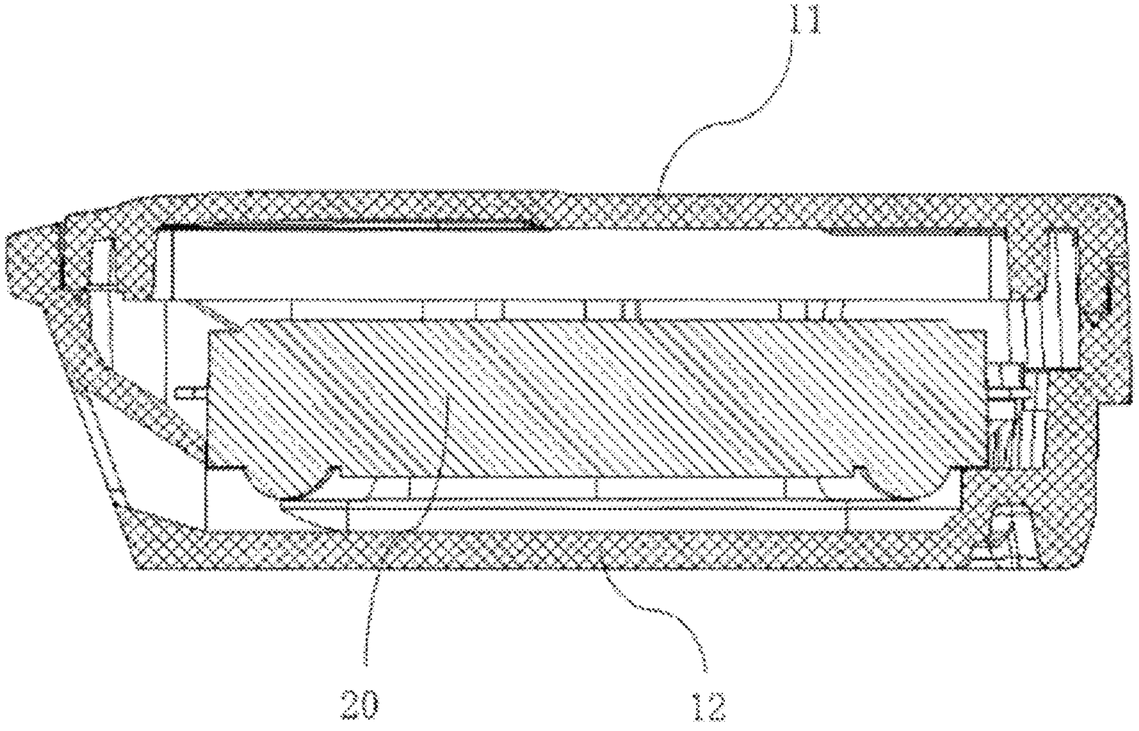
FIG. 4 is a structural diagram of a sound generating device according to another embodiment of the present disclosure.

As shown in FIGS. 3 and 4, at least a part of the housing 10 of the sound generating device 100 according to the embodiment of the present disclosure is formed as a supporting part, at least a part of the supporting part is made of organic aerogel material, the organic aerogel material has a mesh structure on which reinforcement material is distributed, the reinforcement material accounts for 0 wt % to 40 wt % of the supporting part, and a specific modulus of the supporting part is 1.5 GPa·cm$^3$/g to 40 GPa·cm$^3$/g.

In other words, at least a part of the housing 10 of the sound generating device 100 according to the embodiment of the present disclosure is the supporting part, and at least a part of the supporting part is made of the organic aerogel material. It should be noted that the organic aerogel material has characteristics of large porosity and high specific surface area. Most of the volume of the organic aerogel material is composed of air, and the density of organic aerogel is small, for example, the density of the organic aerogel is 0.03 g/cm$^3$ to 1 g/cm$^3$. Therefore, the organic aerogel has an advantage of light weight, may withstand large impact strength, and has a characteristic of being not easy to deform and break when subjected to external force or impact, so that the supporting part with the organic aerogel material is adopted in the present disclosure, which has greater strength and lighter weight, and thus improves the overall strength of the housing 10 including the supporting part, and reduces the overall mass of the housing 10, that is, the housing 10 of the present disclosure has better rigidity and lighter mass at the same time.

Moreover, the organic aerogel material has the mesh structure, the organic aerogel material may be used as a frame, and the reinforcement material is distributed on the mesh structure.

On one hand, by evenly distributing the reinforcement material in the organic aerogel material, the reinforcement material has advantages of large modulus and high rigidity, and the reinforcement material in the organic aerogel material may have a function of reinforcement, which can further improve the structural strength of the supporting part. By providing the reinforcement material, the strength of the frame formed by the organic aerogel material is improved, a shrinkage degree of the organic aerogel material during the drying process is reduced, and thus the mechanical property of the housing 10 made of the supporting part is improved.

On another hand, when the reinforcement material and the organic aerogel material are combined to form the supporting part, especially before freezing and drying the organic aerogel material, polymer chain segments in the organic aerogel material are easy to form a surface layer on a surface of the reinforcement material, which may increase a strength of the frame of the organic aerogel material and reduce the shrinkage of the organic aerogel material during drying. Besides, when the vibration caused by external force applied on the housing 10 meets the reinforcement material, the expansion will be blocked. When the load continues to increase, the reinforcement material is difficult to be separated from the organic aerogel material due to the surface layer of the polymer chain segments, so that the supporting part represents excellent strength and toughness, and thus the housing 10 has a good mechanical property.

On still another hand, the organic aerogel material is used as the frame, which may be formed as the organic aerogel mesh structural material. The reinforcement material is disposed in the organic aerogel material. When the reinforcement material is the reinforcement fibers, the reinforcement fibers may be used as the frame to support the organic aerogel mesh structural material, for example, to support the mesh structure of the organic aerogel material. When the reinforcement material is the reinforcement particles, the reinforcement particles may be combined with the wall inside the organic aerogel mesh structure material, which can also support the organic aerogel material.

In addition, the reinforcement material accounts for 10 wt % to 40 wt % of the supporting part, and a specific modulus of the supporting part is 1.5 GPa·cm$^3$/g to 40 GPa·cm$^3$/g. When the whole of the housing 10 is composed of the supporting part, a specific modulus of the housing 10 may be 1.5 GPa·cm$^3$/g to 40 GPa·cm$^3$/g. The specific modulus here is a modulus-to-density ratio, which refers to the elastic modulus per unit density. As the modulus-to-density ratio increases, the stiffness of the supporting part also increases. In this embodiment, the reinforcement material accounts for 10 wt % to 40 wt % of the supporting part, and the specific modulus of the housing 10 is 1.5 GPa·cm$^3$/g to 40 GPa·cm$^3$/g. At this time, the housing 10 has characteristics of lighter weight and higher strength, thereby reducing the mass of the sound generating device 100 made of the housing 10, and reducing the resonance phenomenon, and thus having strong applicability. If the specific modulus of the supporting part is less than 1.5 GPa·cm$^3$/g, the stiffness of the supporting part will be small, resulting in insufficient stiffness of the housing 10 made of the supporting part. If the specific modulus of the supporting part is greater than 40 GPa·cm$^3$/g, the weight of the supporting part will be greater, and thus the weight of the housing 10 including the supporting part increases correspondingly.

Optionally, the reinforcement material may account for 5 wt %, 10 wt %, 15 wt %, 20 wt %, 25 wt %, 30 wt %, 35 wt % and 40 wt %, etc., in the supporting part, which can ensure stronger strength and lighter weight of the housing 10 at the same time.

According to one embodiment of the present disclosure, the whole of the housing 10 is composed of the supporting part, that is, the whole of the housing 10 may be formed by the supporting part, which can ensure that all parts of the housing 10 have good rigidity and light weight, thus ensuring requirements of the rigidity and the light weight of the entire housing 10 at the same time.

In some embodiments of the present disclosure, the reinforcement material accounts for 10 wt % to 20 wt % of the supporting part, which includes end values. By using the reinforcement material within the scope of the above weight percentage, not only the mass of the supporting part can be reduced, but also it can ensure that the supporting part has a high strength, so that the housing 10 has the advantages of light weight and high strength. If the reinforcement material accounts for less than 10 wt % of the supporting part, the content of the reinforcement material will be too small, and it is difficult to ensure the strength of the supporting part, and the strength of the housing 10 cannot be ensured. If the reinforcement material accounts for more than 20 wt % of the supporting part, the weight of the supporting part will be too large, which will result in a greater weight of the housing 10 including the supporting part. Further, the reinforcement material may account for 11 wt %, 12 wt %, 13 wt %, 14 wt %, 15 wt %, 16 wt %, 17 wt %, 18 wt % and 19 wt %, etc., in the supporting part, which can ensure the weight and the stiffness of the supporting part at the same time, thus ensuring the weight and the stiffness of the housing 10 at the same time.

According to one embodiment of the present disclosure, a density of the supporting part is 0.1 g/cm$^3$ to 1.5 g/cm$^3$, which includes end values. When the whole of the housing 10 is composed of the supporting part, the density of the housing 10 is also 0.1 g/cm$^3$ to 1.5 g/cm$^3$. When the density of the supporting part is less than 0.1 g/cm$^3$, although the density of the housing 10 made of the supporting part is small, it is easy to cause the defect of low modulus of the housing 10. However, when the density of the supporting part is greater than 1.5 g/cm$^3$, the housing 10 made of the supporting part has defects of high density, high quality, lower modulus-to-density ratio, and cannot reduce the weight of the housing 10.

Optionally, the density of the supporting part may be 0.1 g/cm$^3$, 0.3 g/cm$^3$, 0.5 g/cm$^3$, 0.7 g/cm$^3$, 0.8 g/cm$^3$, 1.3 g/cm$^3$, 1.5 g/cm$^3$, etc., which can meet the requirements for light weight and large modulus of the supporting part at the same time. Thus, the housing 10 can meet the requirements of reducing weight and improving modulus at the same time. Thus, in this embodiment, the density of the supporting part is 0.1 g/cm$^3$ to 1.5 g/cm$^3$. By using the supporting part in this density range, the supporting part may have a characteristic of low density, so that the housing 10 has a characteristic of large modulus.

In some detailed embodiments of the disclosure, the reinforcement material is reinforcement fibers and/or reinforcement particles. In other words, the reinforcement material may choose any one of the reinforcement fibers or the reinforcement particles. Specifically, the reinforcement fibers may be used as a frame structure to support the organic aerogel material, most of the load may be suffered by the reinforcement fibers, the organic aerogel material may be used as a medium to transfer and disperse the load, and the reinforcement fibers have the advantages of large modulus and high rigidity.

According to one embodiment of the present disclosure, the reinforcement fibers form a mesh structure by the organic aerogel material. It may be understood that since the reinforcement fibers represent a form of a mesh structure in space, when the composite material composed of the reinforcement fibers and the organic aerogel material is subjected to the external load, the reinforcement fibers may suffer the load stress and reduce a crack of the organic aerogel material itself. In addition, even if the crack is occurred in the organic aerogel material, the spread of the crack may be prevented due to the presence of the reinforcing fibers at the position of the crack. When the reinforcement fibers are distributed in the form of single fibers, it is advantageous to the uniformity of the distribution of the reinforcement fibers in the organic aerogel material and the appearance quality of the surface of the supporting part.

In addition, the reinforcement fibers accounts for 0 wt % to 40 wt % of the supporting part, which includes the end values. By providing the reinforcement fibers within the scope of the above weight percentage, it can ensure that the supporting part has a lighter mass, so as to reduce the weight of the housing 10. For example, the reinforcement fibers account for 5 wt %, 10 wt %, 15 wt %, 20 wt %, 25 wt %, 30 wt %, 35 wt % and 40 wt %, etc., in the supporting part, which can ensure the larger modulus and lighter weight of the housing 10 at the same time.

Preferably, the reinforcing fibers accounts for 10 wt % to 20 wt %. If the content of the reinforcement fibers is less than 10 wt %, the content of the reinforcement fibers is too small, it is difficult to increase the modulus of the supporting part significantly, resulting in a small modulus of the supporting part. If the content of the reinforcement fibers is higher than 20%, the content of the reinforcement fibers is too large, which is easy to cause the reinforcement fibers to intertwine with each other, resulting in the difficulty of the dispersion of the reinforcement fibers, which affect the uniformity of the strength of the structure of the various parts of the prepared supporting part, and will also increase the weight of the supporting part. When the reinforcement fibers account for 10 wt % to 20 wt %, the specific modulus of the supporting part obtained by the combined of the reinforcement fibers and the organic aerogel material may reach 3.0 GPa·cm$^3$/g to 40 GPa·cm$^3$/g. It should be noted that when the reinforcement fibers account for 0% in the supporting part, all of the reinforcement material may be composed of the reinforcement particles, or the reinforcement material may include material other than reinforcement fibers and the reinforcement particles, such as sheet material. Optionally, the reinforcement fibers account for 10 wt %, 12 wt %, 13 wt %, 15 wt %, 18 wt %, 20 wt %, etc., which can ensure the structural uniformity and structural strength of the supporting part and the housing 10 at the same time.

In some embodiments of the present disclosure, the organic aerogel material has an open channel, and the reinforcement particles are combined with a wall of the open channel to support the organic aerogel material. It may be understood that the reinforcement particles may be combined with the open channel of the organic aerogel material, that is, combined with the wall of the organic aerogel material and attached to the wall, so as to support the organic aerogel material.

The reinforcement particles may limit the deformation of the organic aerogel material through mechanical constraints, thereby increasing the strength and the modulus of the supporting part, that is, improving the mechanical properties of the housing 10. Here, the load may be shared by both of the organic aerogel material and the reinforcing particles.

Here, the reinforcement particles account for 0 wt % to 30 wt % in the supporting part. When the content of the reinforcement particles is small, the modulus is small, and when the content of the reinforcement particles is high, the mass is large. It should be noted that when the reinforcement particles account for 0% in the supporting part, the whole of the reinforcement material may be composed of the reinforcement fibers, or the reinforcement material may include material other than reinforcement fibers and the reinforcement particles, such as sheet material. Optionally, the reinforcement particles account for 5 wt %, 10 wt %, 13 wt %, 20 wt %, 22 wt %, 30 wt %, etc., in the supporting part, which can ensure the weight and structural strength of the supporting part and the housing 10 at the same time.

Optionally, the reinforcement particles account for 10 wt % to 15 wt %. By using the reinforcement particles within the scope of the above weight percentage, the specific modulus of the supporting part obtained by reinforcing the organic aerogel material with the reinforcement particles may be 1.5 GPa·$cm^3$/g to 30 GPa·$cm^3$/g. If the reinforcement particles account for less than 10%, it is easy to make the content of the reinforcement particles small, and it is difficult to achieve the purpose of improving the structural strength of the supporting part and the housing 10. If the reinforcement particles account for greater than 15%, it is easy to lead to a large content of the reinforcement particles, and thus it is easy to lead to large mass of the supporting part and the housing 10, and it is difficult to meet the light weight requirements of the housing 10. Optionally, the reinforcement particles account for 10 wt %, 11 wt %, 12 wt %, 13 wt %, 15 wt %, etc., which can ensure the weight and structural strength of the housing 10 at the same time.

In addition, the reinforcement fibers and the reinforcement particles may also be used at the same time, and any weight ratio may be adopted for the reinforcement fibers and the reinforcement particles. Optionally, in the reinforcement material, the reinforcement fibers account for 0 wt % to 30 wt %. Optionally, the weight ratio of the reinforcement fibers to the reinforcement particles is greater than 50 wt %. The supporting effect of the reinforcement material on the organic aerogel material may be enhanced by increasing the content of the reinforcement fibers. In addition, the load may be shared by both of the reinforcing fibers and the reinforcing particles, thereby increasing the strength and modulus of the organic aerogel material, and thereby improving the mechanical property of the housing 10. Here, the reinforcement fibers and the reinforcement particles may support the organic aerogel material, and can withstand most load of the housing 10. In addition, the reinforcement particles may restrain the mechanical deformation of the organic aerogel material, and improve the strength and modulus of the dome. The reinforcement fibers and the reinforcement particles may be combined with the organic aerogel material respectively, which can together improve the strength of the supporting part and the housing 10. By adjusting the ratio of the reinforcement fibers and the reinforcement particles, the weight and the modulus of the housing 10 may have more design convenient. For example, the weight ratio of to the reinforcement fibers and the reinforcement particles is 1:1, 2:1, 3:1, etc. At this time, the content of the reinforcement fibers in the supporting part may be designed to be greater than the content of the reinforcement particles, to improve the ability to bear the load for the supporting part.

According to one embodiment of the present disclosure, the organic aerogel material contains polar molecules including at least one of oxygen, hydrogen or nitrogen. Here, the polar molecules may be oxygen, hydrogen, nitrogen molecules, etc., so that a variety of forces, such as physical interaction, chemical bonding, micromechanical adhesion, are generated between the polar functional group in the molecular segments of the organic aerogel material and the reinforcement material. Therefore, when the polymer chain segments of the organic aerogel material form a surface layer on the surface of the reinforcement material, a "gel-frame" structure may be constructed. Even when the organic aerogel material acts as a binder to bond the dispersed reinforcement material together, the reinforcement material may also act as the frame to improve the strength and the modulus, for forming a uniform three-dimensional structure of "gel-frame". Thus, the prepared supporting part has good mechanical properties, so that the housing 10 made of the supporting part also has better mechanical properties.

Optionally, the reinforcement fibers may be made of short fibers or continuous fibers, and the reinforcement fibers may be formed as fabric, non-woven fabric, etc. Optionally, the reinforcement particles may also include inorganic particles such as boron nitride, silicon carbide, carbon black, alumina, etc., and may also be metal particles.

According to one embodiment of the present disclosure, the bending modulus of the supporting part is 0.3 GPa to 20 GPa, and the bending modulus of the housing 10 is 0.3 GPa to 20 GPa when the whole of the housing 10 is made of the supporting part. The bending modulus represents the ability of the material to resist bending deformation within the elastic limit. If the bending modulus of the supporting part is less than 0.3 GPa, it is easy to cause the resonance of the sound generating device 100 made of the supporting part and affect the acoustic performance. Optionally, the bending modulus of the supporting part is 0.3 GPa, 0.5 GPa, 5 GPa, 8 GPa, 10 GPa, 15 GPa, 18 GPa, 20 GPa, etc., which can ensure the ability to resist bending deformation of the housing 10, and ensure the acoustic performance of the corresponding sound generating device 100.

According to one embodiment of the present disclosure, the modulus-to-density ratio of the supporting part is between 1.5 GPa·$cm^3$/g and 40 GPa·$cm^3$/g. When the whole of the housing 10 is composed of the supporting part, the modulus-to-density ratio of the housing 10 is between 1.5 GPa·$cm^3$/g and 40 GPa·$cm^3$/g. Here, the modulus-to-density ratio is the ratio of the modulus to the mass. If the modulus-to-density ratio is larger, it means that the modulus is higher under the same density. In the present disclosure, by adding the reinforcement material, when the modulus is increased, the density of the whole of the housing 10 is also increased, and the light weight effect is not obvious, so it is required to control the modulus-to-density ratio between 1.5 GPa·$cm^3$/g and 40 GPa·$cm^3$/g. Optionally, the modulus-to-density ratio of the supporting part is 1.5 GPa·$cm^3$/g, 3 GPa·$cm^3$/g, 5 GPa·$cm^3$/g, 10 GPa·$cm^3$/g, 15 GPa·$cm^3$/g, 20 GPa·$cm^3$/g, 30 GPa·$cm^3$/g, 35 GPa·$cm^3$/g, 40 GPa·$cm^3$/g, etc., so that it can ensure the light weight and a large modulus of the housing 10.

In some embodiments of the present disclosure, the organic aerogel material is made of at least one of polyimide, polyamide, polyester, aldehyde, polyolefin, polysaccharide, or silicone. Here, the frame of the organic aerogel material of the present disclosure is mainly composed of organic polymers, and mesh structure of the organic polymers of the organic aerogel material remains basically unchanged during the drying process.

In some embodiments of the present disclosure, the thickness of the housing 10 is 0.2 mm to 5 mm. If the thickness of the housing 10 is less than 0.2 mm, it is easy to lead to insufficient rigidity of the housing 10. If the thickness of the housing 10 is greater than 5 mm, it is easy to result in too heavy weight of the housing 10. Optionally, the thickness of the housing 10 is 0.2 mm, 0.5 mm, 0.8 mm, 1.2 mm, 3 mm, 5 mm, etc., which can ensure the requirements of the rigidity and lightweight of the housing 10 at the same time.

According to one embodiment of the present disclosure, the housing 10 also includes a body part adhered to the supporting part or integrally injection molded to the supporting part. Here, the body part is made of at least one of PC or modified material thereof, PA or modified material thereof, PPS or modified material thereof, PP or modified material thereof, ABS or modified material thereof, LCP or modified material thereof, PEI or modified material thereof, phenolic resin or modified material thereof, epoxy resin or modified material thereof, unsaturated polyester or modified material thereof, stainless steel, aluminum alloy, magnesium alloy or metal-based composite material.

The sound generating device 100 according to the embodiment of the present disclosure includes the housing 10 of the sound generating device 100 in any of the above embodiments, and the sound generating device 100 also includes a sound generating unit 20 disposed in the housing 10 to perform electroacoustic conversion and realize the sound generating performance of the sound generating device 100. It should be noted that since the housing 10 at least includes the supporting part, and the supporting part is made of using the reinforcement material to support the organic aerogel material, the supporting part has the characteristics of light weight and high strength, and thus the housing 10 has greater rigidity and light mass. Here, the supporting part may be any part of the housing 10, such as the supporting part alone as at least a part of the housing of a front chamber, or the supporting part alone as at least a part of the housing of the rear chamber, or as at least a part of the housings of the front chamber and the rear chamber, etc. That is, the supporting part of the present disclosure is not limited to the housing of the front cavity or the housing of the rear cavity. When the housing 10 also includes the body part, the body part may not be defined as used for the housing of the front cavity or the housing of the rear cavity. For example, as shown in FIGS. 3 and 4, at least part of the housing of the rear cavity of the housing 10 may be made of the above supporting part, which can not only improve the acoustic performance of the sound generating device 100 and reduce the resonant frequency, but also meet the design requirements for thinness and miniaturization of the sound generating device 100, which improve the applicability of the sound generating device 100 in various electronic apparatus.

The electronic apparatus according to the embodiment of the present disclosure includes the sound generating device 100 according to the above embodiment, wherein the electronic apparatus may be a mobile phone, a laptop computer, a tablet computer, a VR (virtual reality) device, an AR (augmented reality) device, a TWS (true wireless Bluetooth) headset, a smart speaker, etc., which is not limited by the present disclosure.

As the housing 10 of the sound generating device 100 according to the above embodiment of the present disclosure has the above technical effect, the sound generating device 100 and the electronic apparatus according to the embodiment of the present disclosure also have the corresponding technical effect. That is, the housing 10 of the sound generating device 100 has better rigidity and lighter weight, and at the same time, it has a stronger sound effect, and the specific modulus of the product is higher, it can reduce the resonance peak generated by high-frequency vibration, so that the overall sound of the product is better.

The housing 10 of the sound generating device 100 according to the embodiment of the present disclosure will be illustrated in detail in combination with specific Examples.

In Examples 1 and 2, the sound generating device 100 was assembled by the housing 10 and the sound generating unit 20, wherein the whole of the housing 10 of Example 1 was composed of the supporting part made of a carbon fiber reinforced organic aerogel material, which was a polyamidic-acid aerogel made of polyamidic acid salt.

Here, the specific preparation process of the polyamidic acid salt was as follows:

Step 1: 180.22 g (0.9 mol) of 4,4'-diaminodiphenyl ether was dissolved in 1 L of N-methyl pyrrolidone.

Step 2: In an agitation state, 3,3',4,4'-biphenyl tetraacid dianhydride was added in multiple times for a total amount of 294 g (1 mol) to the mixture obtained in the step 1 in a small amount every time, and the polymerization reaction was performed in an ice water bath. The duration of the polymerization reaction was about 5 h.

Step 3: 8 g (0.02 mol) of 1,3,5-tri(aminophenoxy)benzene crosslinker was added to the product obtained in the step 2 to prepare a polyamidic acid salt solution.

Step 4: The polyamidic acid salt solution obtained in the step 3 was slowly poured into acetone for precipitation, to obtain filaments, which were polyamidic acid salt, and they were dried to constant weight.

Example 1

In the present embodiment, the supporting part was formed by combination of carbon fibers accounting for 4 wt % of the supporting part and the organic aerogel material. Here, the specific preparation process of the housing 10 was as follows:

Step 1: 50 g of polyamidic acid salt and the carbon fibers were taken to be evenly prepared as polyamidic acid hydrogel containing 4% carbon fibers with a solid content of 15%.

Step 2: The polyamidic acid hydrogel prepared in the step 1 was heated to 60° C., and injection molded into the housing.

Step 3: The housing prepared in the step 2 was frozen at a temperature of −40° C. for 1 h, and was dried at a degree of vacuum <100 Pa for 2 h.

Step 4: The housing prepared in the step 3 underwent imination for 2 h at a temperature of 300° C. to obtain the carbon fiber reinforced organic aerogel housing.

Example 2

In this embodiment, the whole of the supporting part was made of the organic aerogel material.

Here, the specific preparation process of the housing 10 was as follows:

Step 1: 50 g of polyamidic acid salt was taken to be evenly prepared as a polyamidic acid hydrogel with a solid content of 15%.

Step 2: The polyamidic acid hydrogel prepared in the step 1 was heated to 60° C., and injection molded into the housing.

Step 3: The housing prepared in the step 2 was frozen at a temperature of −40° C. for 1 h, and was dried at a degree of vacuum <100 Pa for 2 h.

Step 4: The housing prepared in the step 3 under went imination for 2 h at a temperature of 300° C. to obtain the organic aerogel housing.

Comparative Example 1

In the Comparative Example 1, the sound generating device was assembled by the housing and a sound generating unit 20. Here, PC resin was used for the housing in the Comparative Example 1. The specific preparation process of the housing of the Comparative Example 1 was as follows: the PC resin was put into the mold at 180° C. for injection molding, and the temperature was kept for 2 minutes to form an injection molding material housing.

That is, the structure of the housing 10 of Example 1 was a reinforced aerogel housing with 4% carbon fiber, the structure of the housing 10 of Example 2 was an organic aerogel housing, while the structure of the housing of the Comparative Example 1 was a PC material housing. Shapes and sizes of the housings in Example 1 and the Comparative Example 1 were identical, except that they were made of different materials.

Figure 2:
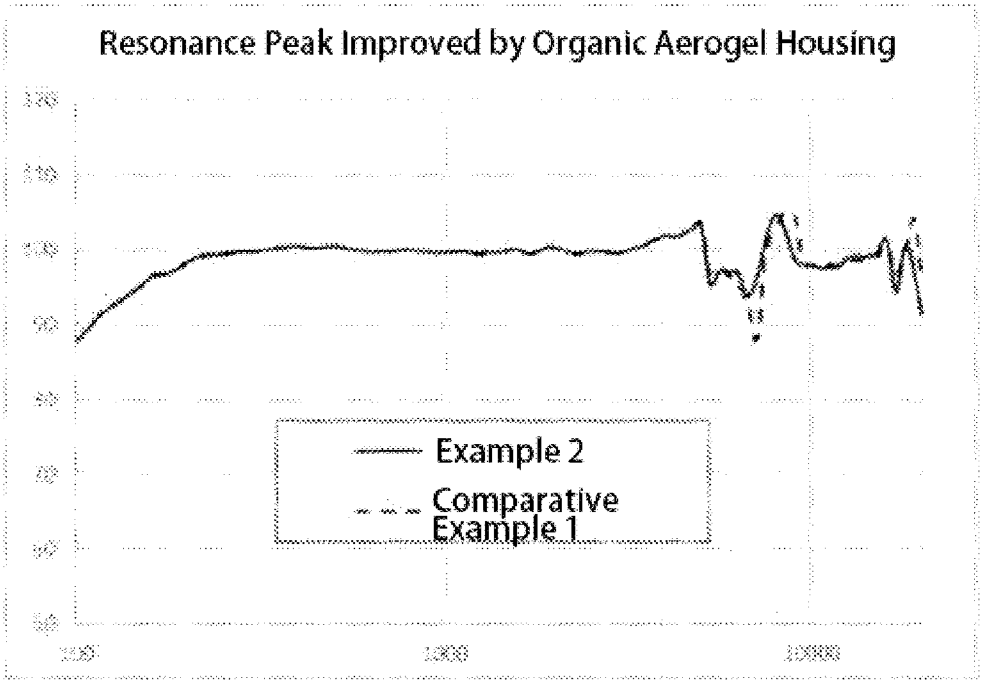
FIG. 2 is resonance peak test diagram of Example 2 and Comparative Example 1 of the sound generating device of the present disclosure.

Tests for weight, thickness, shrinkage, etc. Were performed to the housings prepared by Examples 1, 2 and Comparative Example 1, and the test results are shown in Table 1. Moreover, the housing prepared by Examples 1, 2 and Comparative Example 1 were assembled with the sound generating unit 20 respectively to obtain different sound generating devices, and acoustic tests were performed on each of the sound generating devices respectively. The test results are shown in FIG. 1 and FIG. 2.

TABLE 1

Test results of the housing

| Material | Example 1 | Example 2 | Comparative Example |
|---|---|---|---|
| Weight of housing (mg) | 120 | 40 | 500 |
| Thickness of housing (mm) | 0.4 | 0.4 | 0.4 |
| Shrinkage rate (%) | 5 | 10 | / |
| Content of carbon fibers (%) | 4 | / | / |
| Bending modulus of housing (GPa) | 8.2 | 0.6 | 7.4 |
| Modulus-to-density ratio of housing ( $GPa \cdot cm^3/g$) | 27.3 | 20 | 5.92 |

As can be seen from the Table 1, under the same overall dimensions, that is, the thicknesses corresponding to each of Example 1, Example 2 and Comparative Example 1 was 0.4 mm, the shrinkage rate of the Example 1 was 5%, and the shrinkage rate of Example 2 was 10%. It can be seen that the shrinkage rate of the housing 10 of Example 1 was lower than that of the housing 10 of Example 2.

Moreover, the bending modulus of the housing 10 of Example 1 was 8.4 GPa, the bending modulus of the housing 10 of Example 2 was 0.6 GPa, and the bending modulus of the PC housing of Comparative Example 1 was 7.4 GPa. It can be seen that the bending modulus of Comparative Example 1 was higher than that of the Example 2. The bending modulus of the housing 10 of Example 1 was higher than that of the housing 10 of Example 2.

Moreover, the modulus-to-density ratio of the housing 10 corresponding to Example 1 was 27.3 $GPa \cdot cm^3/g$, and that of the Example 2 was 20 $GPa \cdot cm^3/g$. It can be seen that the specific modulus of Example 1 was higher, and the resonant peak of the acoustic curve was smaller. Moreover, the modulus-to-density ratio of Comparative Example 1 was 5.92 $GPa \cdot cm^3/g$. It can be seen that the modulus-to-density ratio of Example 1 was also greater than that of Comparative Example 1. As can be seen from the stress curve in FIG. 1, the rigidity of Example 1 was higher.

In addition, when comparing Example 2 and Comparative Example 1, the housings of Example 2 and Comparative Example 1 were respectively assembled with a speaker module with the same type of sound generating unit. Combined with FIG. 2, it can be seen that the loudspeaker with the housing in Example 2 can improve the resonance peak. That is, compared with the PC housing of Comparative Example 1, the weight of the housing 10 made of the organic aerogel material of Example 2 was lighter, the weight of the assembled sound generating device may be reduced, and the assembled sound generating device had a greater design margin, the specific modulus of the housing 10 was higher, the resonance peak generated by high-frequency vibration may be reduced, and the overall hearing was better.

Further, as shown in FIGS. 3 and 4, when the housing 10 of the embodiments of the present disclosure includes an upper housing 11 and a lower housing 12, both of the upper housing 11 and the lower housing 12 may be made of the organic aerogel material, and the reinforcement material may be added to either the upper housing 11 or the lower housing 12 to form the supporting part. The weight of the housing 10 using the supporting part is lighter, to reduce the weight of the sound generating device 100 made of the housing 10, and has a larger design margin and higher specific modulus, which can reduce the resonance peak generated by high-frequency vibration, so that the overall hearing is better.

Although some specific embodiments of the present disclosure have been illustrated in detail by examples, it should be understood by those skilled in the art that the above examples are only for illustration and not to limit the scope of the present disclosure. Those skilled in the art should understand that the above embodiments may be modified without deviating from the scope and spirit of the present disclosure. The scope of the present disclosure is limited by the attached claims.

What is claimed is:

1. A housing of a sound generating device, wherein at least a part of the housing is formed as a supporting part, at least a part of the supporting part is made of organic aerogel material, the organic aerogel material has a mesh structure on which reinforcement material is distributed, the reinforcement material accounts for 0 wt % to 40 wt % of the supporting part, and a specific modulus of the supporting part is 1.5 $GPa \cdot cm^3/g$ to 40 $GPa \cdot cm^3/g$.

2. The housing of the sound generating device of claim 1, wherein the whole of the housing is composed of the supporting part.

3. The housing of the sound generating device of claim 1, wherein the reinforcement material accounts for 10 wt % to 20 wt % of the supporting part.

4. The housing of the sound generating device of claim 1, wherein a density of the supporting part is 0.1 g/$cm^3$ to 1.5 g/$cm^3$.

5. The housing of the sound generating device of claim 1, wherein the reinforcement material is reinforcement fibers and/or reinforcement particles.

6. The housing of the sound generating device of claim 5, wherein the reinforcing fibers form the mesh structure by the organic aerogel material, and the reinforcing fibers accounts for 0 wt % to 40 wt % of the supporting part.

7. The housing of the sound generating device of claim 5, wherein the organic aerogel material has an open channel, the reinforcement particles are combined with a wall of the open channel to support the organic aerogel material, and the reinforcement particles account for 0 wt % to 30 wt % of the supporting part.

8. The housing of the sound generating device of claim 1, wherein a bending modulus of the supporting part is 0.3 GPa to 20 GPa; and/or a modulus-to-density ratio of the supporting part is between 1.5 GPa·$cm^3$/g and 40 GPa·$cm^3$/g.

9. The housing of the sound generating device of claim 1, wherein the organic aerogel material is made of at least one selected from a group consisting of polyimide, polyamide, polyester, aldehyde, polyolefin, polysaccharide and silicone.

10. The housing of the sound generating device of claim 1, wherein a thickness of the housing is 0.2 mm to 5 mm.

11. The housing of the sound generating device of claim 1, wherein the housing further comprises a body part adhered to the supporting part or integrally injection molded with the supporting part, wherein the body part is made of at least one selected from a group consisting of PC and modified material thereof, PA and modified material thereof, PPS and modified material thereof, PP and modified material thereof, ABS and modified material thereof, LCP and modified material thereof, PEI and modified material thereof, phenolic resin and modified material thereof, epoxy resin and modified material thereof, unsaturated polyester and modified material thereof, stainless steel, aluminum alloy, magnesium alloy and metal-based composite material.

12. A sound generating device comprising:

the housing of the sound generating device of claim 1.

13. An electronic apparatus comprising the sound generating device of claim 12.

* * * * *